(12) United States Patent
Huang

(10) Patent No.: US 6,902,140 B1
(45) Date of Patent: Jun. 7, 2005

(54) ADJUSTABLE SUPPORT FOOT

(76) Inventor: Shih-Yi Huang, 14F-2, No. 30, Sec. 3, Min Sheng Rd., Panchiao City, Taipei Hsien (TW)

( * ) Notice: Subject to any disclaimer, the term of this patent is extended or adjusted under 35 U.S.C. 154(b) by 0 days.

(21) Appl. No.: 10/809,404

(22) Filed: Mar. 26, 2004

(51) Int. Cl.⁷ .......................................... F16M 11/24
(52) U.S. Cl. .................. 248/188.4; 248/188.2; 248/188.5; 248/188.8
(58) Field of Search .............. 248/188.4, 188.2, 248/188.8, 188.5, 677; 182/200, 108

(56) References Cited

U.S. PATENT DOCUMENTS

| | | | | |
|---|---|---|---|---|
| 4,792,017 A | * | 12/1988 | Grove | 182/204 |
| 5,000,416 A | * | 3/1991 | Fantasia | 248/650 |
| 5,148,892 A | * | 9/1992 | Lu | 182/201 |
| 5,660,362 A | * | 8/1997 | Selby et al. | 248/188.4 |
| 5,853,065 A | * | 12/1998 | Hutson et al. | 182/18 |
| 6,442,906 B1 | * | 9/2002 | Hwang | 52/126.6 |
| 6,536,725 B2 | * | 3/2003 | Fisher | 248/188.4 |
| 6,711,985 B1 | * | 3/2004 | Doyle | 92/117 A |
| 6,796,001 B1 | * | 9/2004 | Finkelstein | 16/32 |
| 6,799,660 B1 | * | 10/2004 | Crawford | 182/200 |

* cited by examiner

Primary Examiner—Leslie A. Braun
Assistant Examiner—Steven Marsh
(74) Attorney, Agent, or Firm—Troxell Law Office, PLLC

(57) ABSTRACT

An adjustable support foot comprises a support post, a plurality of retaining plates, a control device and an outer shell. The support post has a base and a screwed axle erected thereon. The retaining plates each provided with a screw thread cover around the screwed axle and are further enclosed by the control device including a retaining cylinder and a control ring. The control device urges the retaining plates to engage the screwed axle or depart from the screwed axle, by which the relative position of the support post in the outer shell can be quickly or mildly changed.

10 Claims, 5 Drawing Sheets

ADJUSTABLE SUPPORT FOOT

BACKGROUND OF THE INVENTION (a) Field of the Invention

The present invention relates to adjustable support foots, and more particularly to an adjustable support foot mounted beneath a stepladder, a frame structure, a piece of furniture or a machine so that the height thereof can be adjusted to maintain stability.

(b) Description of the Prior Art

The purpose of an adjustable support foot of the prior art mounted under a stepladder, a frame structure, a piece of furniture or a machine is for maintaining balance of the object thereon. It mainly includes a support pad and a bolt device above the foot. The bottom of an object, a stepladder, a frame structure, a piece of furniture or a machine, is provided with a plurality of adjustable support foots which are secured within corresponding screw holes thereon. To adjust the height of the support foots, some of the support pads have to be rotated, which is rather time consuming. For a user who needs to shift a stepladder or a frame structure around during operation, the adjustment of the conventional support foots appears rather inconvenient, especially when the stepladder or the frame structure is used on a rugged and rough ground. Therefore, adjustable support foots of the prior art comprising a support pad and a bolt device cannot meet the requirement of promoting work efficiency.

SUMMARY OF THE INVENTION

Accordingly, the primary objective of the present invention is to provide an adjustable support foot whose height can be quickly adjusted. The adjustable support foot comprises a support post, a plurality of retaining plates, a control device and an outer shell. The support post is a cylindrical body provided with a screwed axle in its upper section and a cup base in its lower section. The retaining plates are provided with screw threads on the inner surfaces thereof. The screwed axle is covered by the retaining plates, and then enclosed within a control device that includes a retaining cylinder and a control ring. The control device can decouple the retaining plates from the screwed axle or reengage them together. An outer shell further encloses the control device. Thereby, the height of the adjustable support foot thus formed can be quickly adjusted.

The secondary objective of the present invention is to provide an adjustable support foot wherein the number of the retaining plates engaged with the screwed axle can be two or more than two.

The various objects and advantages of the present invention will be more readily understood from the following detailed description when read in conjunction with the appended drawings.

DETAILED DESCRIPTION OF THE PREFERRED EMBODIMENTS

Figure 1:
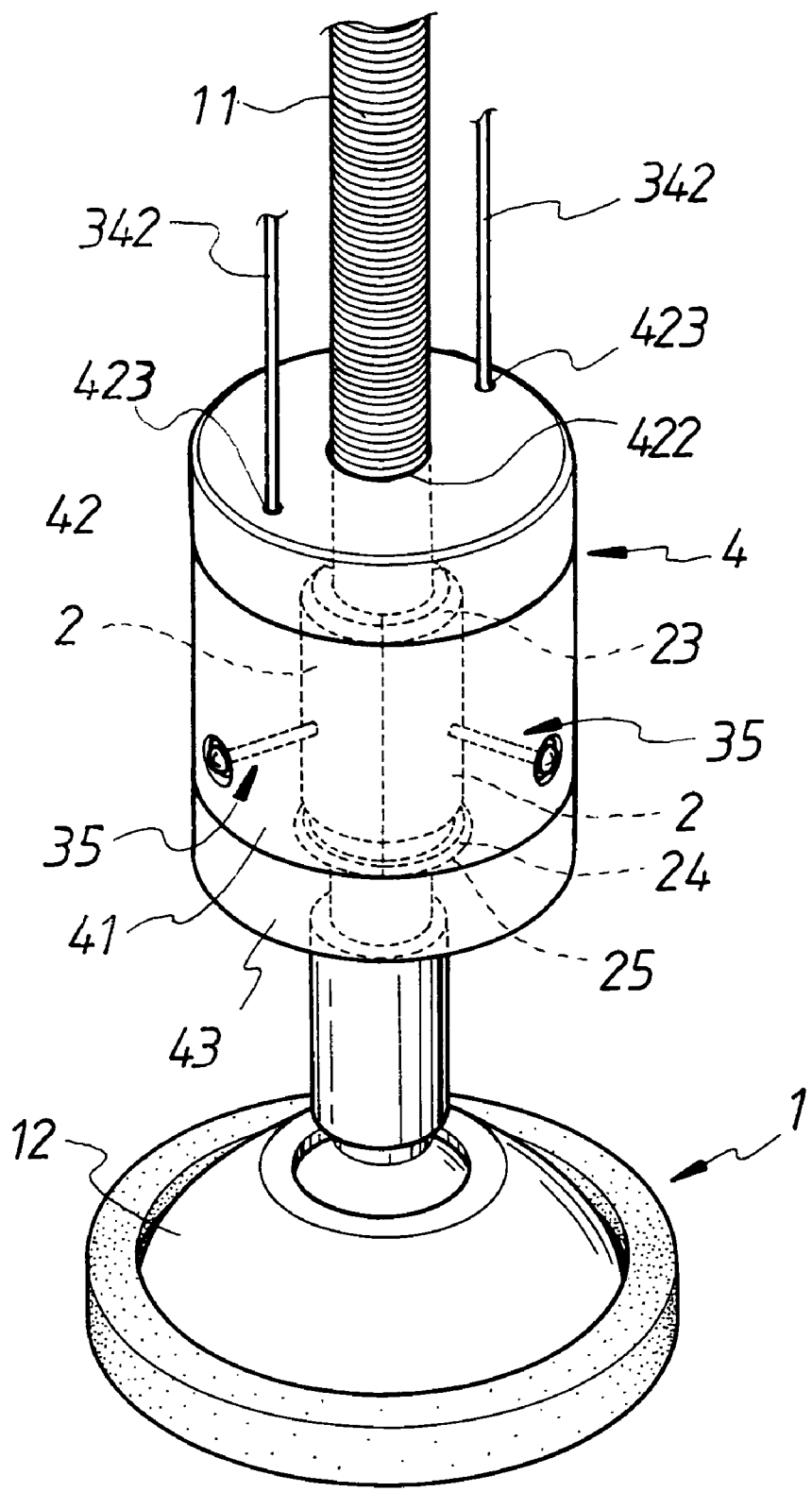
FIG. 1 is a perspective view of an adjustable support foot according to the present invention.
Figure 2:
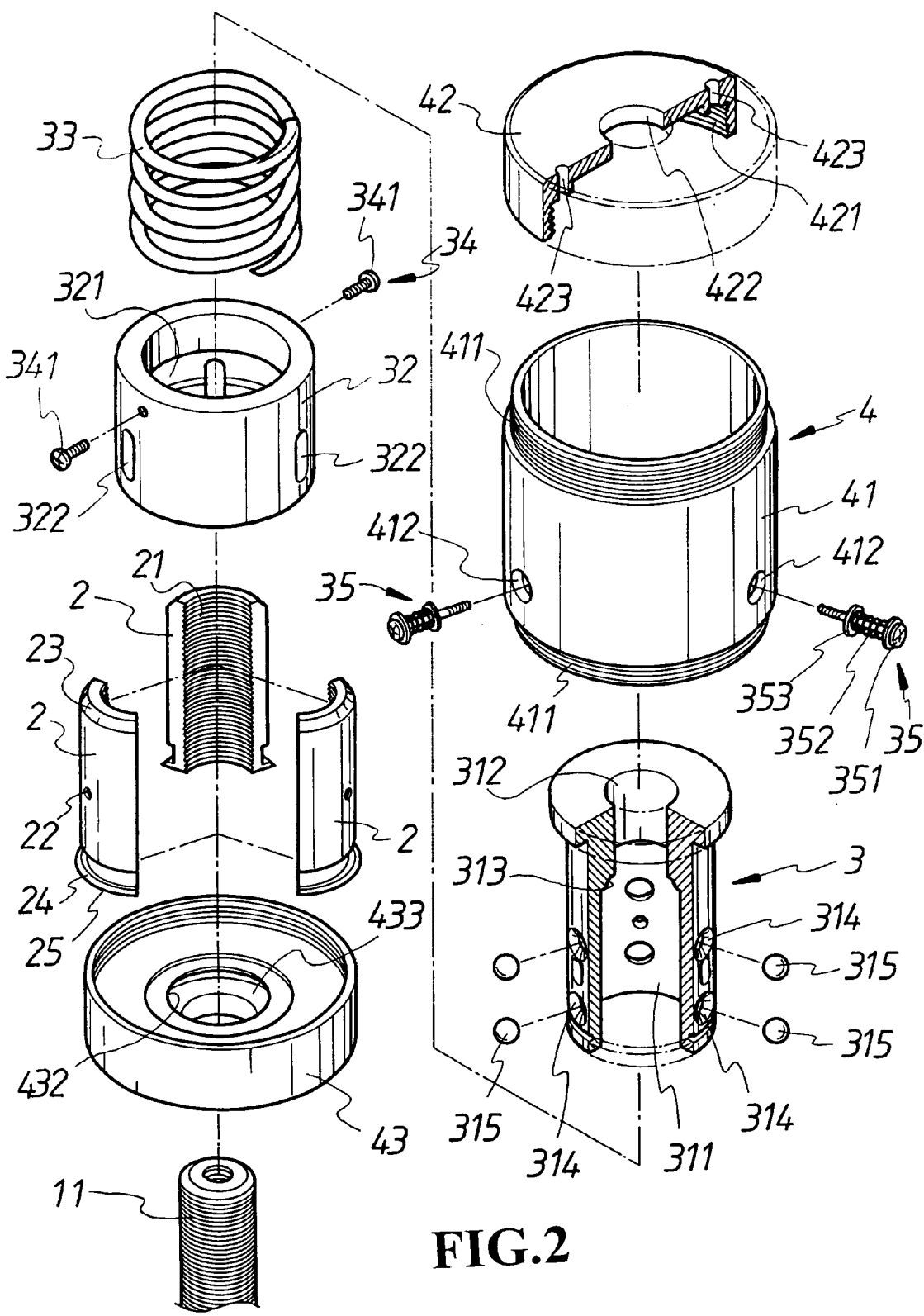
FIG. 2 is an exploded perspective view of an adjustable support foot according to the present invention.

Referring to FIGS. 1 and 2, an adjustable support foot according to the present invention comprises a support post 1, a plurality of retaining plates 2, a control device 3 and an outer shell 4.

As shown in FIG. 1, the upper portion of the support post 1 is provided with a screwed axle 11, and the lower portion of the support post 1 is provided with a cup base 12. The axis of the cup base 12 can be fixed or of cardan shaft.

As shown in FIG. 2, the retaining plates 2 are elongated plates arced in the transverse direction. The inner wall of each of the retaining plates 2 is provided with a screw thread 21 capable of being engaged with the screwed axle 11. The outer wall of each of the retaining plates 2 is provided with at least one screw hole 22. A tapered surface 23 is formed on a lateral side of the outer wall of each of the retaining plates. The lower rim of each of the retaining plates 2 is provided with a flange 25 having a tapered surface 24, by which the screw thread 21 thereof can be engaged or decoupled with the screwed axle 11.

Figure 3:
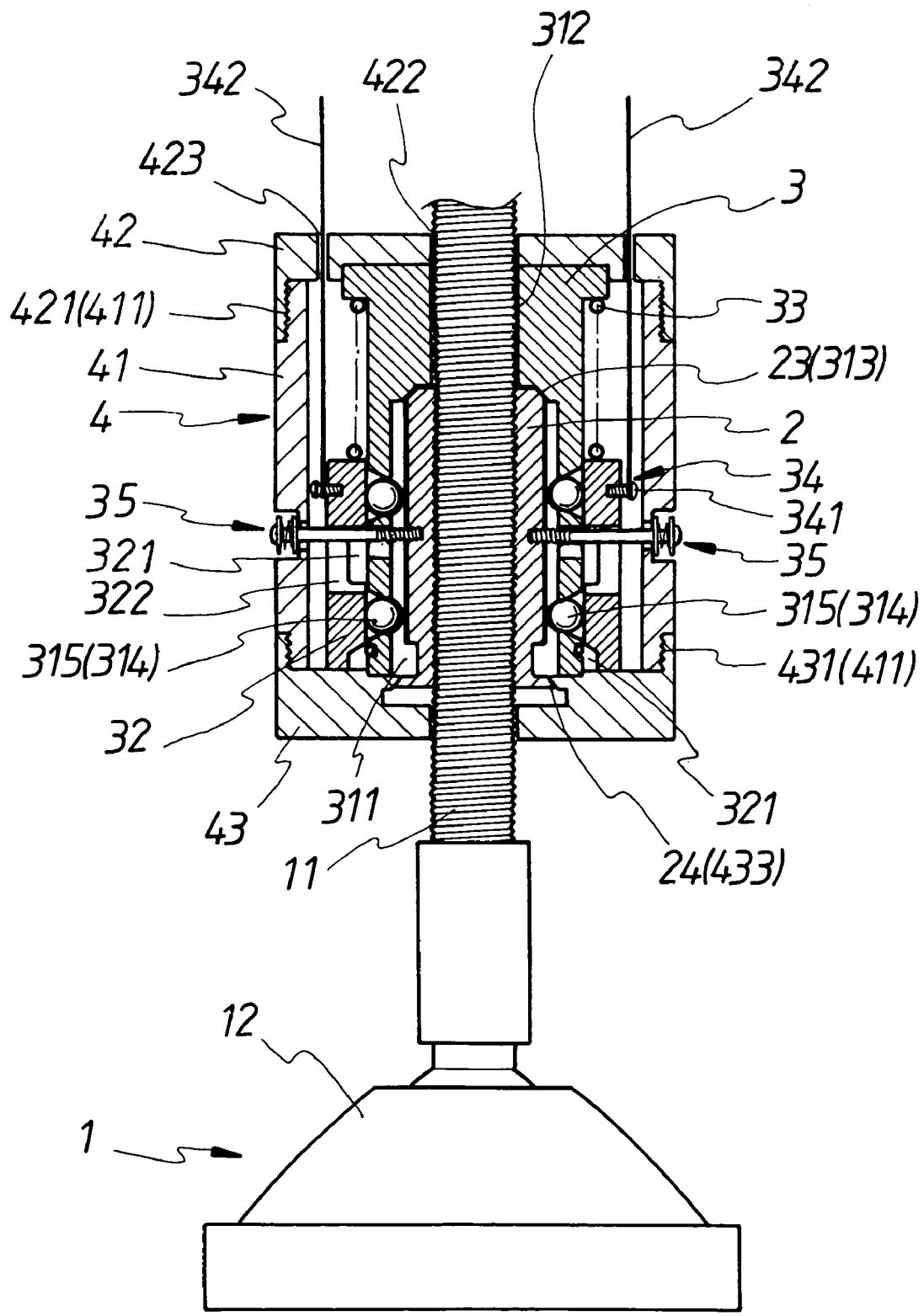
FIG. 3 is a cross-sectional view of an adjustable support foot according to the present invention wherein the retaining plates and the screwed axle are engaged.

As shown in FIGS. 2 and 3, the control device 3 comprises a retaining cylinder 31, a control ring 32, a spring 33, an axial actuator 34 and a radial actuator 35. The lateral cross-section of the retaining cylinder 31 is T-shaped and hollow along the axial direction. The bottom end of the retaining cylinder 31 is provided with a receiving hole 311, and the innermost end of the receiving hole 311 is provided with an axial hole 312 going through the upper portion of the retaining cylinder 31 in the axial direction. Between the receiving hole 311 and the axial hole 312, there forms a tapered section 313. The outer wall of the retaining cylinder 31 are further provided with at least two conic holes 314 which are tapered inwardly to connect the receiving hole 311 within the retaining cylinder 31. Each of the conic holes 314 can house a steel ball 315, the inner portion of which extends into the receiving hole 311. The control ring 32 is substantially a ring body, the inner wall of which is provided with a groove 321 corresponding to the conic holes 314. The wall of the control ring 32 is further provided with a plurality of slots 322 for restricting the steel balls 315 in the conic holes 314 and confining the control ring 32 to attach around the retaining cylinder 31. The spring 33 is located in the upper section of the retaining cylinder 31 for urging a downward force on the control ring 32. On the other hand, the upper end of the spring 33 presses against an upper flange of the retaining cylinder 31, so that the control ring 32 tends to situate at the lower end of the retaining cylinder 31. The axial actuator 34 consists of a plurality of screws 341 uniformly mounted around the outer wall of the control ring 32 and a plurality of steel slings 342 each connected to a screw 341. As shown in FIG. 3, the steel slings 342 urge the control ring 32 to elevate by which the steel balls 315 fall into the groove 321 on the inner wall of the control ring 32. The radial actuator 35 includes a plurality of screws 351, each further including an elastic member 352 (such as a spring) and a spacer 353. The screws 351 of the radial actuator 35 are inserted around the control ring 32, through the slots 322 thereof and the outer shell 4.

Figure 4:
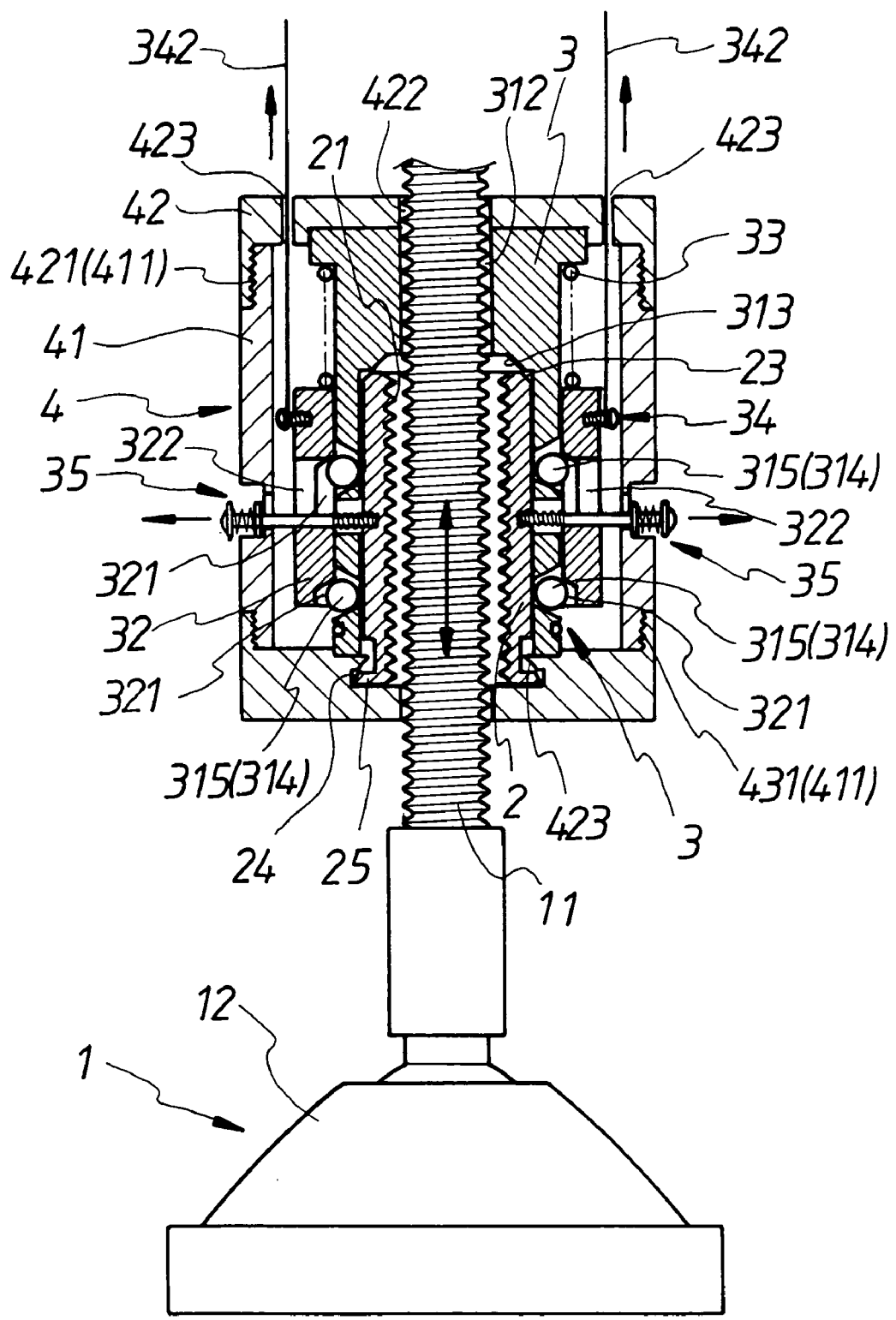
FIG. 4 is a cross-sectional view of an adjustable support foot according to the present invention wherein the retaining plates and the screwed axle are decoupled.

As shown in FIG. 4, the outer shell 4 is a hollow shell body enclosing the control device 3, which comprises a lateral wall 41, an upper cover 42 and a lower cover 43. The upper and lower ends of the lateral wall 41 are respectively provided with an outer screw thread 411 for engaging with the upper cover 42 and the lower cover 43. The lateral wall 41 is further provided with a plurality of through holes 412 for receiving the screws 351 of the radial actuator 35. The through holes 412 situate at selected places around the lateral wall 41, corresponding to the slots 322 on the control ring 32. The inner wall of the upper cover 42 is a cap body of U-shaped cross-section and is provided with an inner screw thread 421. The top surface of the upper cover 42 further includes an axial hole 422 and at least two through holes 423 for passing the steel sling 342. The inner wall of the lower cover 43 is a cap body of U-shaped cross-section and is provided with an inner screw thread 431. The bottom surface of the lower cover 43 further includes an axial hole 432. The upper section of the axial hole 432 forms a conic portion 433 having an inner wall tapered upward.

Referring to FIGS. 1 and 3, at least two retaining plates 2 (in this preferred embodiment, three retaining plates 2) are used to retain the screwed axle 11 of the support post 1. The retaining plates 2 are further applied with the retaining cylinder 31 and the receiving hole 311 of the control device 3. The outer shell 4 is then used to enclose the control device 3, whereby the screwed axle 11 goes through axial holes 312, 422 and 432 and the tapered surfaces 23 thereof are engaged with the tapered section 313 and the flanges 25 thereof are secured in the conic portion 433 of the lower cover 43. The screws 351 of the radial actuator 35 on the control device 3 goes through the through holes 412 of the lateral wall 41, the slots 322 of the control ring 32 and the retaining cylinder 31, eventually being secured in the screw holes 22 of the retaining plates 2. The elastic members 352 and the spacers 353 tend to pull the retaining plates 2 outward. The steel slings 342 of the axial actuator 34, going through the through holes 423 of the upper cover 42, can be controlled from outside to move the control ring 32 along the screwed axle 11. Thereby, the adjustable support foot has the function of quickly adjusting the height thereof.

Referring to FIG. 3, to use the present invention, the control ring 32 is pushed downward by the spring 33 so that the steel balls 315 are shifted inward to support against the outer walls of the retaining plates 2, whereby the retaining plates 2 are driven inward to almost engage the screwed axle 11. The self gravity of the object the adjustable support foot supports presses the outer shell 4 and the retaining cylinder 31 of the control device 3 downward, whereas the retaining plates 2 move upward and the upper tapered surfaces 23 and the lower tapered surfaces 24 thereof respectively engage the tapered section 313 of the retaining cylinder 31 and the conic portion 433 of the outer shell 4. Thereby, the retaining plates 2 shift inward again to engage the screwed axle 11, and the height of the support post 1 is fixed. It is a further function that the height of the support post 1 can be mildly adjusted to maintain stability. Referring to FIG. 4, to quickly elevate the support post 1, the steel slings 342 are pulled to urge the control ring 32 moving upward, whereby the groove 321 on the inner wall thereof may align with the steel balls 315 so that the steel balls 315 depart from form the retaining plates 2 to drop in the groove 321. The elastic force applied by radial actuator 35 then pulls the retaining plates 2 away from the screwed axle 11, and therefore the support post 1 can move freely. After the height adjustment, the above procedure can be applied again to secure the support post 1.

Figure 5:
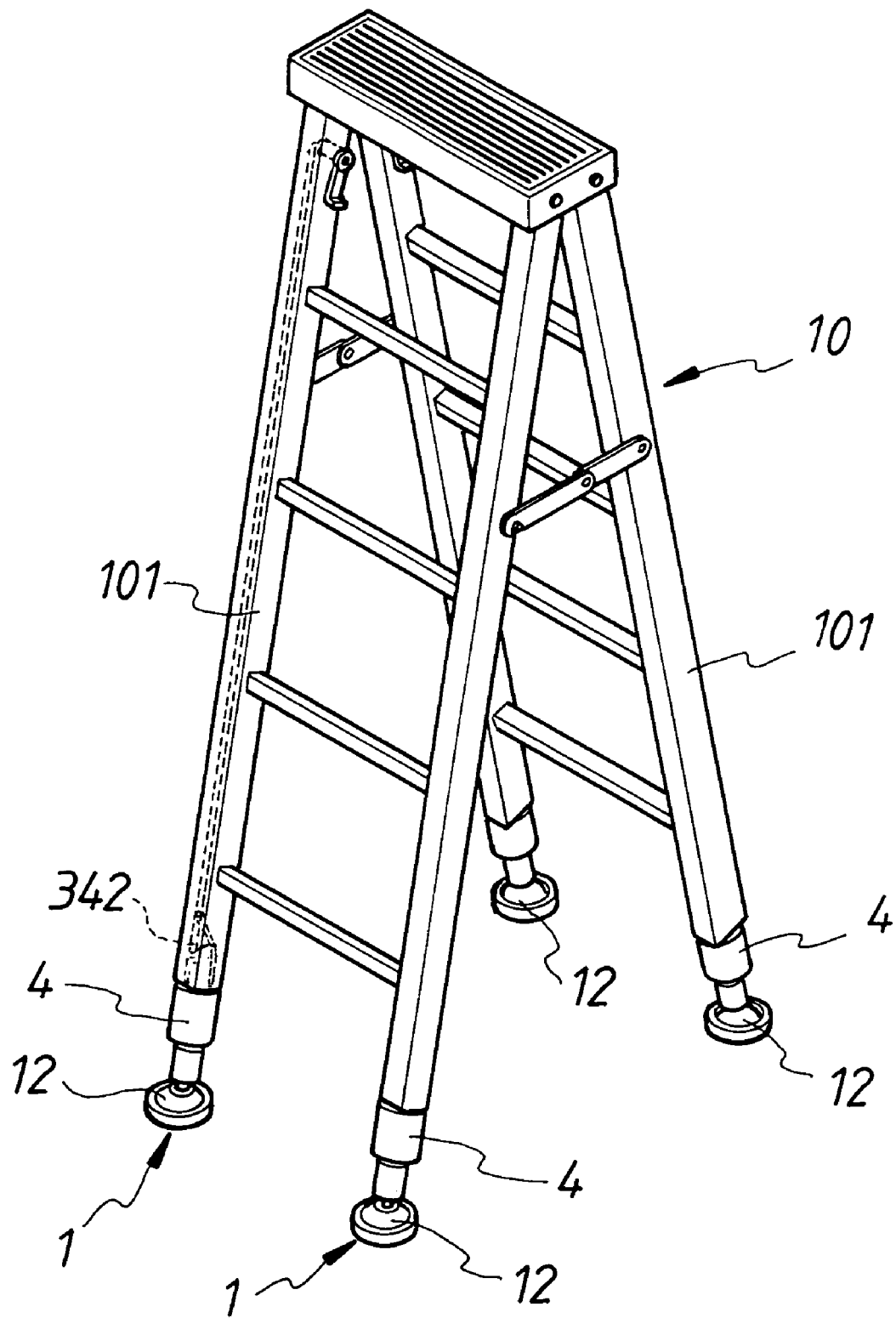
FIG. 5 illustrates a plurality of adjustable support foots according to the present invention mounted beneath the feet of a stepladder.

Therefore, adjustable support foots according to the present invention can be widely applied to the bottom surface of a stepladder, a frame structure, a piece of furniture or a machine so that the height thereof can be quickly adjusted to maintain stability, particularly suiting an object that needs to shift around. As shown in FIG. 5, a plurality of adjustable support foots are mounted on the bottom of a stepladder 10, and the steel slings 342 thereof are guided to a proper location in the upper portion of the stepladder 10. A person stepping on the stepladder who needs to adjust the height of the adjustable support foots for fitting a rugged ground can pull the steel slings 342 to balance the stepladder.

However, the axial actuator 34 of the present invention is not restricted to a plurality of screws 341 and a plurality of steel slings 342. It can be pull rods screw mounted onto the outer wall of the control ring 32. The pull rods extend out of the outer shell 4 so that they can be pulled to control the elevation of the control ring 32. The main purpose of the radial actuator 35 is to detach the retaining plates 2 form the screwed axle 11. Therefore, any structure capable of achieving the effect, such as a spring, can be applied, not restricted to a screw 351, an elastic member 352 and a movable spacer 353. Further, the outer shell 4 may comprises only a ring shell having a U-shaped cross-section and a cover. The outer shell 4 can also be a part of the machine the adjustable support foot is attached to. For example, the shaft 101 of the stepladder 10 can replace the outer shell 4.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An adjustable support foot, comprising:

a support post having a base and a screwed axle erected thereon;

a plurality of retaining plates each provided with a screw thread on an inner wall thereof, a rim of an upper end of each of said retaining plates being provided with a tapered surface, a rim of a lower end of each of said retaining plates being provided with a transverse flange having a tapered surface;

a control device including a retaining cylinder, a control ring, a spring, an axial actuator and a radial actuator, said retaining cylinder being a hollow cylindrical body provided with a lower receptacle hole and an upper axial hole, a top end of said receptacle hole being connected to said axial hole through a tapered section, a wall of said retaining cylinder surrounding said receptacle hole being provided with a plurality of inwardly tapered through holes each for housing a steel ball, said control ring being a ring body enclosing said retaining cylinder, an inner wall having a plurality of slots, said spring coaxially situating in an upper portion of said retaining cylinder and constantly pushing said control ring downward, said axial actuator being connected to said control ring for controlling the elevation of said control ring, said radial actuator being connected to said retaining plates for pulling said retaining plates outward by an elastic means thereof; and an outer shell being a hollow shell body enclosing said control device, said outer shell having two axial holes each on a top surface and a bottom surface thereof, said bottom axial hole further including an upwardly tapered section;

whereby at least two retaining plates are used to engage said screwed axle of said support post and then housed in said receptacle hole of said retaining cylinder, said retaining plates being secured within said retaining cylinder by engaging said upper tapered surfaces of said retaining plates with said tapered section of said retaining cylinder and said flanges of said retaining plates with said tapered section of said outer shell, said axial actuator and said radial actuator capable of being controlled from outside for quickly adjusting the height of said adjustable support foot.

2. The adjustable support foot of claim 1 wherein the shaft of said base of said support post is selected from the group of a fixed shaft and a swivel shaft.

3. The adjustable support foot of claim 1 wherein said retaining plates are elongated plate having an arced transverse cross-section and each provided with a screw hole for connecting said radial actuator.

4. The adjustable support foot of claim 1 wherein the number of said retaining plates is determined by the diameter of said screwed axle of said support post.

5. The adjustable support foot of claim 1 wherein said retaining cylinder of said control device is of T-shaped lateral cross-section and is provided with a ring flange at an upper end thereof.

6. The adjustable support foot of claim 1 wherein said control ring of said control device is provided with a plurality of elongated slots for situating said axial actuator.

7. The adjustable support foot of claim 1 wherein said axial actuator of said control device is a plurality of screws secured within the lateral wall of said control ring, wherein each of said screws is wound around by a steel sling, and wherein each of said steel slings extends out of said outer shell so that they can be pulled from outside.

8. The adjustable support foot of claim 1 wherein said axial actuator of said control device is a pull rod screw-mounted on the outer lateral wall of said control ring, said pull rod extending out of the outer lateral wall of said outer shell.

9. The adjustable support foot of claim 1 wherein said radial actuator of said control device is a plurality of screws going through said outer shell, said control ring and said retaining cylinder and connected to said retaining plates, each of said screws further including an elastic member and a spacer for urging said retaining plates to move outward.

10. The adjustable support foot of claim 1 wherein said outer shell further comprises a lateral wall, an upper cover and a lower cover, wherein said lateral wall is provided with screw threads each around an upper rim and a lower rim thereof for securing said upper cover and said lower cover, wherein said lateral wall is further provided with a plurality of through holes for passing said radial actuator, wherein said upper cover is of U-shaped lateral cross-section, and is provided with a screw thread around an inner lateral wall thereof and a plurality of through holes for passing said steel slings and an axial hole on the top surface thereof, and wherein said lower cover is of U-shaped lateral cross-section and is provided with a screw thread around an inner lateral wall thereof and an axial hole and an upwardly tapered conic hole on a bottom surface thereof.

* * * * *